(12) United States Patent
Sorstedt et al.

(10) Patent No.: US 10,025,995 B2
(45) Date of Patent: Jul. 17, 2018

(54) OBJECT DETECTING ARRANGEMENT

(71) Applicant: VOLVO CAR CORPORATION, Gothenburg (SE)

(72) Inventors: Joakim Lin Sorstedt, Gothenburg (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 128 days.

(21) Appl. No.: 15/177,595

(22) Filed: Jun. 9, 2016

(65) Prior Publication Data

US 2016/0379063 A1 Dec. 29, 2016

(30) Foreign Application Priority Data

Jun. 23, 2015 (EP) ..................................... 15173382

(51) Int. Cl.
*H04N 5/225* (2006.01)
*G06K 9/00* (2006.01)
(Continued)

(52) U.S. Cl.
CPC ......... *G06K 9/00791* (2013.01); *B60Q 1/525* (2013.01); *B60R 1/00* (2013.01);
(Continued)

(58) Field of Classification Search
CPC .. H04N 5/2256; H04N 5/225; G06K 9/00791; G06K 9/00476; G06K 9/52;
(Continued)

(56) References Cited

U.S. PATENT DOCUMENTS

2012/0002050 A1 1/2012 Taniguchi et al.
2014/0218521 A1 8/2014 Tanaka
(Continued)

FOREIGN PATENT DOCUMENTS

JP 2005216255 A 8/2005
JP 2006290273 A 10/2006
KR 101496322 B2 3/2015

OTHER PUBLICATIONS

Extended European Search Report dated Jan. 5, 2016, Application No. 15173382.1-1803—Applicant Volvo Car Corporation, 10 Pages.

*Primary Examiner* — Sherrie Hsia
(74) *Attorney, Agent, or Firm* — Brooks Kushman P.C.

(57) ABSTRACT

An object detecting arrangement is configured to detect objects in a field surrounding a vehicle hosting the arrangement. The arrangement comprises an imaging unit configured to capture images of the field. The imaging unit is arranged at the vehicle such that the field is in a direction of at least one of a side of the vehicle, and a rear of the vehicle. The arrangement further comprises a processing unit configured to detect objects in the field. The processing unit is configured to determine an object detecting capability. In addition, the arrangement comprises an illumination unit configured to illuminate the field when the object detecting capability is lower than a first predetermined threshold value. The present disclosure also relates to a lane keeping arrangement, a positioning arrangement and a method of detecting objects.

12 Claims, 2 Drawing Sheets

(51) Int. Cl.
  *B60Q 1/52* (2006.01)
  *G08G 1/16* (2006.01)
  *B60R 1/00* (2006.01)
  *G06K 9/46* (2006.01)
  *G06K 9/52* (2006.01)
  *G06K 9/62* (2006.01)
  *G06T 7/60* (2017.01)
  *G06T 7/73* (2017.01)

(52) U.S. Cl.
  CPC ....... *G06K 9/00476* (2013.01); *G06K 9/4661* (2013.01); *G06K 9/52* (2013.01); *G06K 9/6215* (2013.01); *G06T 7/60* (2013.01); *G06T 7/73* (2017.01); *G08G 1/165* (2013.01); *G08G 1/166* (2013.01); *G08G 1/167* (2013.01); *G08G 1/168* (2013.01); *H04N 5/2256* (2013.01); *G06T 2207/30252* (2013.01)

(58) Field of Classification Search
  CPC ........ G06K 9/6215; B60Q 1/525; B60R 1/00; G06T 7/60; G06T 2207/30252; G08G 1/165; G08G 1/166; G08G 1/167; G08G 1/168
  USPC ........ 348/148, 142, 169, 135; 340/937, 988; 382/103, 104
  See application file for complete search history.

(56) References Cited

U.S. PATENT DOCUMENTS

2014/0257640 A1   9/2014  Mitsumoto et al.
2017/0083774 A1*  3/2017  Solar .................. G06K 9/00798

* cited by examiner

OBJECT DETECTING ARRANGEMENT

CROSS-REFERENCE TO RELATED APPLICATIONS

This application claims foreign priority benefits under 35 U.S.C. § 119(a)-(d) to European patent application number EP 15173382.1, filed Jun. 23, 2015, which is incorporated by reference in its entirety.

TECHNICAL FIELD

The present disclosure relates to an object detecting arrangement configured to detect objects in a field surrounding a vehicle hosting the arrangement, a method of detecting objects in a field surrounding a vehicle, a lane keeping arrangement, a positioning arrangement and a vehicle comprising an object detecting arrangement.

BACKGROUND

Electronic driving-aids have become increasingly present in today's cars. Examples of such electronic driving-aids are positioning arrangements configured to determine a position of a vehicle hosting such a positioning arrangement, lane keeping arrangements configured to control steering of a vehicle hosting such a lane keeping arrangement to assist a host vehicle driver in keeping a travel path of the host vehicle within a vehicle lane, blind spot notification arrangements configured to provide a notification in a driver environment of a vehicle hosting such a blind spot notification arrangement in case a surrounding vehicle is in a blind spot area of the host vehicle. Various sensor systems have been developed for such electronic driving-aids. Among them, object detecting arrangements comprising imaging units configured to capture images of a field surrounding a vehicle hosting the units and processing units configured to detect objects in the field by processing images captured by the imaging units.

The document US 2014257640 A1 relates to a vehicle travel track control device which includes a forward image capture device which captures an image ahead of a vehicle, and side image capture devices which capture an image on the left side and/or the right side of the vehicle. When it is possible to properly execute a travel track control on the basis of captured forward image information ahead of the vehicle, the travel track control is executed on the basis of the captured forward image information sent from the forward image capture device, and when it is not possible to properly execute a travel track control on the basis of the captured forward image information, the travel track control is executed on the basis of at least captured side image information sent from the side image capture devices.

In some situations, object detecting arrangements comprising imaging units face difficulties in detecting objects and there is room for improvement of the capability to detect objects in a field surrounding a vehicle.

SUMMARY

An object of the present disclosure is to provide an object detecting arrangement with an improved capability to detect objects in a field surrounding a vehicle hosting the arrangement.

According to an aspect of the disclosure, the object is achieved by an object detecting arrangement configured to detect objects in a field surrounding a vehicle hosting the arrangement, where the arrangement comprises an imaging unit configured to capture images of the field where the imaging unit is arranged at the vehicle such that the field is in a direction of at least one of a side of the vehicle, and a rear of the vehicle, where the direction of the side of the vehicle is essentially perpendicular to an intended direction of travel of the vehicle, and where the arrangement further comprises a processing unit configured to detect objects in the field by processing images captured by the imaging unit wherein the processing unit is further configured to determine an object detecting capability representative of a capability of the processing unit to detect objects in the field, and where the arrangement further comprises an illumination unit configured to illuminate the field when the object detecting capability is lower than a first predetermined threshold value.

Since the illumination unit is configured to illuminate the field when the object detecting capability is lower than a first predetermined threshold value, the arrangement has an improved capability to detect objects in the field since the field is illuminated when the object detecting capability is lower than the first predetermined threshold value.

As a result, an improved object detecting arrangement is provided with an improved capability to detect objects in a field surrounding a vehicle hosting the arrangement.

Thus, the above mentioned object is achieved.

Optionally, the processing unit is configured to determine the object detecting capability by processing the images captured by the imaging unit. Thereby, an easy and reliable determination of the object detecting capability is provided. Further, an instant determination of the object detecting capability can be achieved. Even further, a situation based determination of the object detecting capability is provided.

Optionally, the processing unit is configured to determine a distance to an object in the field and where the object detecting capability is based on the distance. Since the object detecting capability is based on the distance, objects at a greater distance from the vehicle hosting the arrangement will more likely be illuminated than objects closer to the vehicle hosting the arrangement. As a result, the object detecting capability is further improved.

Optionally, the processing unit is configured to determine the object detecting capability by determining an illumination condition in the field. Since the object detecting capability is determined by determining an illumination condition in the field, the field is illuminated when an illumination condition in the field is poor. As a result, the object detecting capability is further improved.

Optionally, the arrangement further comprises a positioning arrangement configured to determine a geographic position of the vehicle, where the processing unit is configured to determine the object detecting capability based on the geographic position of the vehicle. Since the processing unit is configured to determine the object detecting capability based on the geographic position of the vehicle, fields surrounding a vehicle will be illuminated when the geographic position of the vehicle corresponds to a position where an object detecting capability is low. Examples of such geographic positions are road tunnels, refuges, shady areas, locations where road markings are difficult to detect, etc.

Optionally, the illumination unit comprises ground lights arranged to illuminate a ground surface surrounding the vehicle upon entry into, or upon exit from, the vehicle, to improve light conditions at the ground surface. Since illumination unit comprises ground lights, ground lights already comprised in a ground light arrangement of the vehicle may be comprised in, and utilized by, the object detecting arrangement provided. As a result, the object detecting arrangement may be provided at a low cost since no additional illumination units needs to be provided at the vehicle. In addition, the object detecting arrangement will not affect the visual appearance of the vehicle hosting the arrangement.

Optionally, the illumination unit is configured to illuminate the field with a higher luminosity when the object detecting capability is lower than a second predetermined threshold value, than when the object detecting capability is between the first predetermined threshold value and the second predetermined threshold value, where the object detecting capability below the second predetermined threshold is lower than an object detecting capability between the first predetermined threshold value and the second predetermined threshold value.

Since the illumination unit is configured to illuminate the field with a higher luminosity when the object detecting capability is lower than a second predetermined threshold value, than when the object detecting capability is between the first predetermined threshold value and the second predetermined threshold value, the illumination is provided in a manner adapted to the object detecting capability. That is, a higher luminosity is provided in situations where the object detecting capability is below the second predetermined threshold than in situations where the object detecting capability is between the first predetermined threshold value and the second predetermined threshold value. As a result, the object detecting capability is further improved. As a further result, a lower luminosity is provided when the object detecting capability is between the first predetermined threshold value and the second predetermined threshold value that will suffice for detection of objects. Further, distraction of surrounding vehicle drivers and pedestrians is avoided in situations where the object detecting capability is between the first predetermined threshold value and the second predetermined threshold value.

Further embodiments herein aim to provide a lane keeping arrangement comprising an object detecting arrangement according to some embodiments. Since the lane keeping arrangement comprises an object detecting arrangement, a lane keeping arrangement is provided which utilizes the improved object detecting capability of the object detecting arrangement. As a result, an improved lane keeping arrangement is provided having an improved ability to keep a travel path of the vehicle hosting the lane keeping arrangement within a vehicle lane.

Further embodiments herein aim to provide a positioning arrangement comprising an object detecting arrangement according to some embodiments, where the positioning arrangement comprises a processing unit and a communication unit configured to receive electronic map data representative of an environment surrounding the vehicle from a database holding the electronic map data, where the processing unit is configured to determine a position of the vehicle by comparing a position of an object detected by the object detecting arrangement with a position of the object in the electronic map data. Since positioning arrangement comprises an object detecting arrangement according to some embodiments, a positioning arrangement is provided which utilizes the improved object detecting capability of the object detecting arrangement. As a result, an improved positioning arrangement is provided having an improved capability to determine a position of the vehicle.

Further embodiments herein aim to provide a vehicle comprising an object detecting arrangement according to some embodiments.

Further embodiments herein aim to provide a method of detecting objects in a field surrounding a vehicle using an object detecting arrangement hosted in the vehicle, where the arrangement comprises an imaging unit configured to capture images of the field where the imaging unit is arranged at the vehicle such that the field is in a direction of at least one of a side of the vehicle, and a rear of the vehicle, where the direction of the side of the vehicle is essentially perpendicular to an intended direction of travel of the vehicle, and where the arrangement further comprises a processing unit and an illumination unit where the method comprises:

capturing images of the field using the imaging unit,
detecting objects in the field by,
processing images captured by the imaging unit using the processing unit,
determining an object detecting capability representative of a capability of the processing unit to detect objects in the field using the processing unit, and
illuminating the field when the object detecting capability is lower than a predetermined threshold value, using the illumination unit.

Since the method comprises the step of illuminating the field when the object detecting capability is lower than the first predetermined threshold value, a method is provided having an improved capability to detect objects in the field since the field is illuminated when the object detecting capability is lower than a first predetermined threshold value.

As a result, an improved method of detecting objects is provided with an improved capability to detect objects in a field surrounding a vehicle.

Optionally, the method further comprises:
determining the object detecting capability by
processing the images captured by the imaging unit using the processing unit.

Thereby, an easy and reliable determining of the object detecting capability is provided. Further, an instant determining of the object detecting capability is provided. Even further, a situation based determining of the object detecting capability is provided.

Optionally, the method further comprises:
determining a distance to an object in the field, and
determining the object detecting capability based on the distance, using the processing unit.

Since the object detecting capability is based on the distance, objects at a greater distance from the vehicle hosting the arrangement will more likely be illuminated than objects closer to the vehicle hosting the arrangement. As a result, the object detecting capability is further improved.

Optionally, the method further comprises:
determining the object detecting capability by,
determining an illumination condition in the field using the processing unit.

Since the object detecting capability is determined by determining an illumination condition in the field, the field is illuminated when an illumination condition in the field is poor. As a result, the object detecting capability is further improved.

Optionally, the arrangement further comprises a positioning arrangement comprising the object detecting arrangement, a processing unit, and a communication unit, where the method further comprises:

receiving electronic map data representative of an environment surrounding the vehicle from a database holding the electronic map data, using the communication unit, and determining a position of the vehicle by, comparing a position of an object detected by the object detecting arrangement with a position of the object in the electronic map data, using the processing unit.

Thereby, a method is provided having an improved capability to determine a position of the vehicle since the method provided has an improved capability to detect objects in the field and since the method comprises comparing a position of an object detected by the object detecting arrangement with a position of the object in the electronic map data.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various aspects of the disclosure, including particular features and advantages, will be readily understood from the following detailed description and the accompanying drawings.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
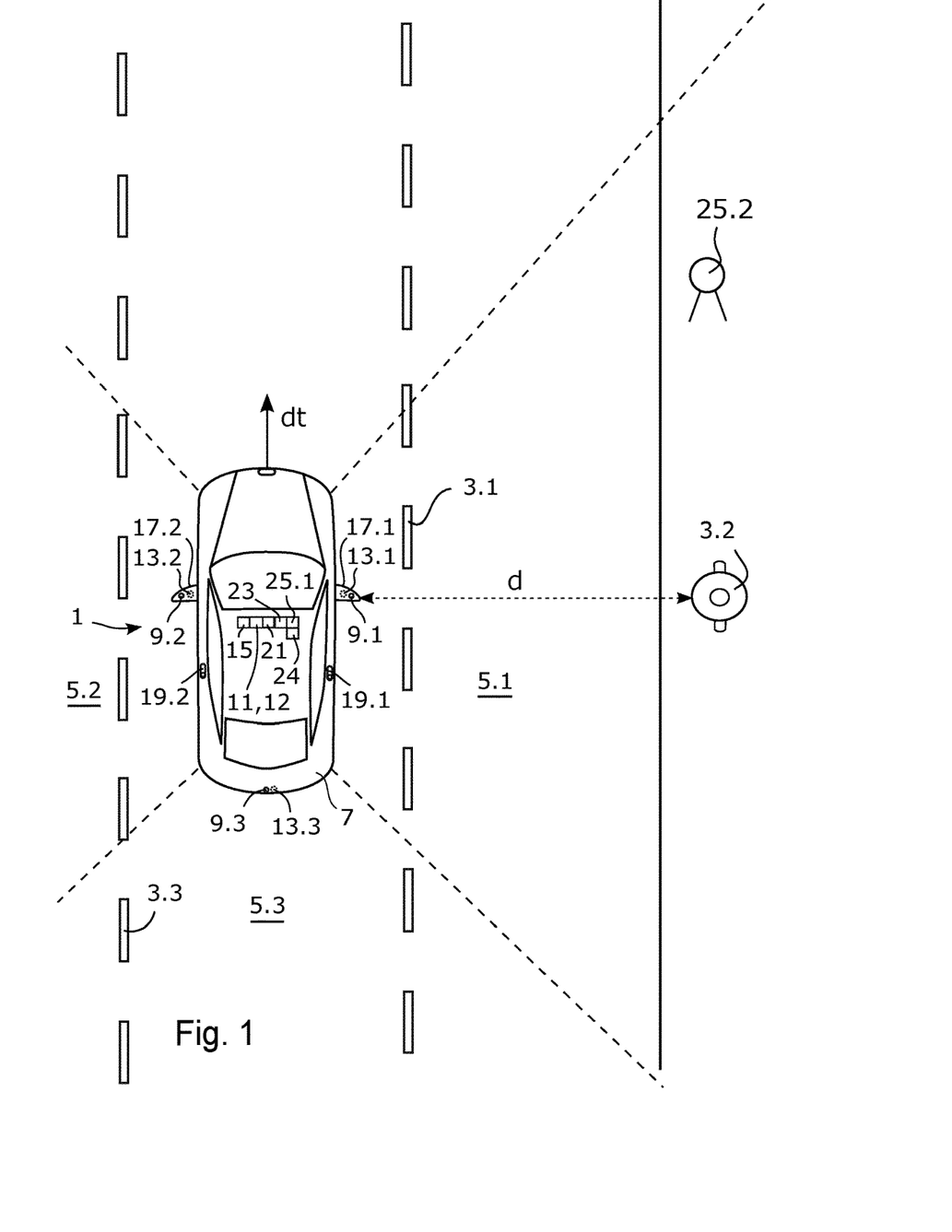
FIG. 1 illustrates a vehicle comprising an object detecting arrangement according to some embodiments.

FIG. 1 illustrates a vehicle 7 comprising an object detecting arrangement 1 according to some embodiments. The object detecting arrangement 1 is configured to detect objects 3.1, 3.2, 3.3 in a field 5.1, 5.2, 5.3 surrounding the vehicle 7 hosting the arrangement 1. The arrangement 1 comprises an imaging unit 9.1, 9.2, 9.3 configured to capture images of the field 5.1, 5.2, 5.3. The imaging unit 9.1, 9.2, 9.3 is arranged at the vehicle 7 such that the field 5.1, 5.2, 5.3 is in a direction of at least one of a side of the vehicle 7, and a rear of the vehicle 7. The direction of the side of the vehicle 7 is essentially perpendicular to an intended direction of travel dt of the vehicle 7. The arrangement 1 further comprises a processing unit 11 configured to detect objects 3.1, 3.2, 3.3 in the field 5.1, 5.2, 5.3 by processing images captured by the imaging unit 9.1, 9.2, 9.3. The processing unit 11 is further configured to determine an object detecting capability representative of a capability of the processing unit 11 to detect objects 3.1, 3.2, 3.3 in the field 5.1, 5.2, 5.3. The arrangement 1 further comprises an illumination unit 13.1, 13.2, 13.3 configured to illuminate the field 5.1, 5.2, 5.3 when the object detecting capability is lower than a first predetermined threshold value.

The imaging unit 9.1, 9.2, 9.3 may comprise a camera unit capable of capturing images of visible light and/or a camera unit capable of capturing an image of invisible light, such as an infrared camera. As illustrated in FIG. 1, the arrangement 1 may comprise more than one imaging unit 9.1, 9.2, 9.3. For example, as in the embodiment illustrated in FIG. 1, the arrangement 1 comprises three imaging units 9.1, 9.2, 9.3. A first imaging unit 9.1, arranged at the vehicle 7 such that a first field 5.1 is covered by the first imaging unit 9.1 in a direction to the right in relation to an forward direction of travel dt of the vehicle 7. A second imaging unit 9.2, arranged at the vehicle 7 such that a second field 5.2 is covered by the second imaging unit 9.2 in a direction to the left in relation to an forward direction of travel dt of the vehicle 7. A third imaging unit 9.3, arranged at the vehicle 7 such that a third field 5.3 is covered by the second imaging unit 9.3 in a direction to the rear of the vehicle 7 in relation to an forward direction of travel dt of the vehicle 7. Accordingly, the field 5.1, 5.2, 5.3 surrounding the vehicle 7 from the right to the left via the rear of the vehicle 7 is covered by imaging units 9.1, 9.2, 9.3.

The processing unit 11 is configured to detect objects 3.1, 3.2, 3.3 in the field 5.1, 5.2, 5.3 by processing images captured by the imaging unit 9.1, 9.2, 9.3. The processing of the images in order to detect objects 3.1, 3.2, 3.3 in the field 5.1, 5.2, 5.3 may comprise a comparison of the images captured with images stored in a database. As an alternative, or in addition, the processing of the images in order to detect objects 3.1, 3.2, 3.3 in the field 5.1, 5.2, 5.3 may comprise a discernment of objects by identifying areas of the field having brightness, contrast or color differing from brightness, contrast or color of a background of the field.

The processing unit 11 is configured to detect objects such as lane markings 3.1, 3.3, other vehicles, pedestrians, objects 3.3 at the side of a road, roadside boundaries, objects painted on a road surface in addition to lane markings such as arrows, numbers, stop lines, etc.

The illumination unit 13.1, 13.2, 13.3 may comprise one or more Light-Emitting Diodes (LED), one or more light bulbs, or the like, configured to illuminate the field 5.1, 5.2, 5.3 when the object detecting capability is lower than a first predetermined threshold value. In embodiments where the illumination unit 13.1, 13.2, 13.3 comprises a camera unit capable of capturing images of light invisible to human vision, such as infrared light, the illumination unit 13.1, 13.2, 13.3 comprises light emitting units configured to emit invisible light, such as infrared light.

As illustrated in FIG. 1, the arrangement 1 may comprise more than one illumination unit 13.1, 13.2, 13.3. For example, as in the embodiment illustrated in FIG. 1, the arrangement 1 comprises three illumination units 13.1, 13.2, 13.3. A first illumination unit 13.1, arranged at the vehicle 7 such that the first illumination unit 13.1 is configured to illuminate the first field 5.1 in a direction to the right in relation to an forward direction of travel dt of the vehicle 7. A second illumination unit 13.2, arranged at the vehicle 7 such that the second illumination unit 13.2 is configured to illuminate the second field 5.2 in a direction to the right in relation to an forward direction of travel dt of the vehicle 7.

A third illumination unit 13.3, arranged at the vehicle 7 such that the third illumination unit 13.3 is configured to illuminate the third field 5.3 in a direction to the rear of the vehicle 7 in relation to an forward direction of travel dt of the vehicle 7. Thereby, the field 5.1, 5.2, 5.3 surrounding the vehicle 7 from the right to the left via the rear of the vehicle 7 will be covered by illumination units 13.1, 13.2, 13.3. In addition, a respective side of the vehicle 7 may comprise more than one illumination unit.

According to some embodiments, the arrangement 1 is configured such that when the object detecting capability is lower than a first predetermined threshold value in a particular field 5.1, 5.2, 5.3, only that particular field is illuminated by the illumination unit 13.1, 13.2, 13.3. Thereby, unnecessary distraction of other vehicle drivers or surrounding pedestrians can be avoided.

In embodiments where the arrangement 1 comprises more than one imaging unit 9.1, 9.2, 9.3, the arrangement 1 may be configured to identify the imaging unit 9.1, 9.2, 9.3 which captured the image in which an object was detected by the processing unit 11. Thus, also the field 5.1, 5.2, 5.3, in which the object was detected may be identified. The identification of the field 5.1, 5.2, 5.3, in which the object was detected may be utilized to improve functionality of an electronic driving-aid system such as a positioning arrangement, a lane keeping arrangement and/or, a blind spot notification arrangement.

According to some embodiments, the illumination unit 13.1, 13.2 comprises ground lights arranged to illuminate a ground surface surrounding the vehicle 7 upon entry into, or upon exit from, the vehicle 7, to improve light conditions at the ground surface. As is illustrated in FIG. 1, such illumination units 13.1, 13.2 may be arranged at a respective side view mirror 17.1, 17.2 of the vehicle 1 hosting the arrangement 1. As an alternative, or in combination, such illumination units 13.1, 13.2 may be arranged at a respective door handle 19.1, 19.2 of the vehicle 1 hosting the arrangement 1. Thus, ground lights already comprised in a ground light arrangement of the vehicle 1 may be comprised in, and utilized by, the object detecting arrangement 1.

According to some embodiments, the processing unit 11 is configured to determine the object detecting capability by processing the images captured by the imaging unit 9.1, 9.2, 9.3. Such determining may comprise a determining of a capability in detecting objects by a comparison of images captured with images stored in a database. As an alternative, or in addition, such determining may comprise a determining of a capability of identifying areas of the field having brightness, contrast or color differing from brightness, contrast or color of a background of the field. Even further, such determining may comprise identification of a lack of detection of an object 3.1, 3.2, 3.3 with an expected detection of an object 3.1, 3.2, 3.3.

According to some embodiments, the processing unit 11 is configured to determine a distance d to an object 3.2 in the field 5.1, and where the object detecting capability is based on the distance d. The distance d may for example be determined by processing images captured by the imaging unit 9.1, 9.2, 9.3. In such embodiments, an assumption can be made that a road surface surrounding the vehicle 7 hosting the arrangement 1 is essentially flat. The processing unit 11 may be configured to determine an angle from an object detected, for example a lane marking, to a horizontal plane and/or a vertical plane and therefrom, determine the distance to the object.

The object detecting capability is based on the distance d in a manner such that the object detecting capability is lower in case of a greater distance to an object, than in case of a shorter distance to an object.

According to some embodiments, the arrangement 1 comprises a positioning arrangement 23 comprising a processing unit 12 and a communication unit 24 configured to receive electronic map data representative of an environment surrounding the vehicle 7 from a database 25.1, 25.2 holding the electronic map data, where the processing unit 12 is configured to determine the distance d from the vehicle 7 to an object 3.2 by comparing a position of an object 3.2 detected by the object detecting arrangement 1 with a position of the object 3.2 in the electronic map data.

According to some embodiments, the processing unit 11 is configured to determine the object detecting capability by determining an illumination condition in the field 5.1, 5.2, 5.3. According to some embodiments, the determination of an illumination condition in the field 5.1, 5.2, 5.3 is performed by processing images captured by the imaging unit 9.1, 9.2, 9.3.

According to some embodiments, the arrangement 1 comprises a positioning arrangement 15 configured to determine a geographic position of the vehicle 7, where the processing unit 11 is configured to determine the object detecting capability based on the geographic position of the vehicle 7. Examples of such geographic positions are road tunnels, refuges, shady areas, locations where road markings are difficult to detect, etc.

According to some embodiments, the illumination unit 13.1, 13.2, 13.3 is configured to illuminate the field 5.1, 5.2, 5.3 with a higher luminosity when the object detecting capability is lower than a second predetermined threshold value, than when the object detecting capability is between the first predetermined threshold value and the second predetermined threshold value, where the object detecting capability below the second predetermined threshold is lower than an object detecting capability between the first predetermined threshold value and the second predetermined threshold value.

Thereby, the illumination is provided in a manner adapted to the object detecting capability. That is, a higher luminosity is provided in situations where the object detecting capability is below the second predetermined threshold, than in situations where the object detecting capability between the first predetermined threshold value and the second predetermined threshold value. As a result, the object detecting capability is further improved. As a further result, a lower luminosity is provided when the object detecting capability is between the first predetermined threshold value and the second predetermined threshold value. Thereby, distraction of surrounding vehicle drivers and pedestrians is avoided in situations where the object detecting capability is between the first predetermined threshold value and the second predetermined threshold value.

Further, according to some embodiments, the illumination unit 13.1, 13.2, 13.3 is configured to illuminate the field 5.1, 5.2, 5.3 with a luminosity being step-wise adapted to more than two predetermined threshold values such that a higher luminosity is provided in cases of lower object detecting capabilities than in cases of higher object detecting capabilities. Even further, according to some embodiments, the illumination unit 13.1, 13.2, 13.3 is configured to illuminate the field 5.1, 5.2, 5.3 with a luminosity gradually adapted to a level of the object detecting capability. Thereby, in these embodiments of the arrangement 1, the object detecting capability is further improved and distraction of surrounding vehicle drivers and pedestrians is further avoided.

FIG. 1 also illustrates a lane keeping arrangement 21 comprising an object detecting arrangement 1 according to some embodiments. The lane keeping arrangement 21 is arranged to control steering of the vehicle 7 hosting the arrangement such that a travel path of the vehicle 7 is kept within a vehicle lane. The control of the steering is, at least partially, based on positions of objects 3.1, 3.2, 3.3 detected by the object detecting arrangement 1. Since the lane keeping arrangement 21 comprises an object detecting arrangement 1, a lane keeping arrangement 21 is provided which utilizes the improved object detecting capability of the object detecting arrangement 1. As a result, an improved lane keeping arrangement 21 is provided having an improved ability to keep the travel path of the vehicle 7 hosting the lane keeping arrangement 21 within a vehicle lane.

FIG. 1 also illustrates a positioning arrangement 23 comprising an object detecting arrangement 1 according to some embodiments. The positioning arrangement 23 comprises a processing unit 12 and a communication unit 24 configured to receive electronic map data representative of an environment surrounding the vehicle 7 from a database 25.1, 25.2 holding the electronic map data, where the processing unit 12 is configured to determine a position of the vehicle 7 by comparing a position of an object 3.2 detected by the object detecting arrangement 1 with a position of the object 3.2 in the electronic map data. Since the positioning arrangement 23 comprises an object detecting arrangement 1, the positioning arrangement 23 utilizes the improved object detecting capability of the object detecting arrangement 1. As a result, positioning arrangement 23 is provided having an improved ability to determine a position of the vehicle 7 hosting the positioning arrangement 23.

Figure 2:
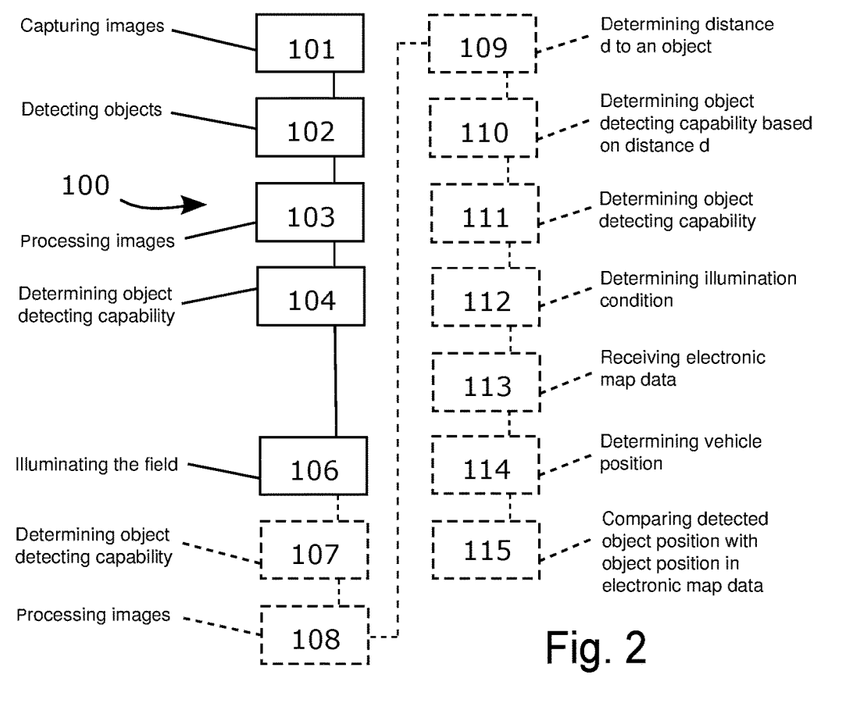
FIG. 2 illustrates a method of detecting objects according to some embodiments.

FIG. 2 illustrates a method 100 of detecting objects 3.1, 3.2, 3.3 in a field 5.1, 5.2, 5.3 surrounding a vehicle 7 using an object detecting arrangement 1 hosted in the vehicle 7, where the arrangement 1 comprises an imaging unit 9.1, 9.2, 9.3 configured to capture images of the field 5.1, 5.2, 5.3, where the imaging unit 9.1, 9.2, 9.3 is arranged at the vehicle 7 such that the field 5.1, 5.2, 5.3 is in a direction of at least one of a side of the vehicle 7, and a rear of the vehicle 7, where the direction of the side of the vehicle 7 is essentially perpendicular to an intended direction of travel dt of the vehicle 7, and where the arrangement 1 further comprises a processing unit 11 and an illumination unit 13.1, 13.2, 13.3, where the method 100 comprises:

capturing 101 images of the field 5.1, 5.2, 5.3, using the imaging unit 9.1, 9.2, 9.3, detecting 102 objects 3.1, 3.2, 3.3 in the field 5.1, 5.2, 5.3 by, processing 103 images captured by the imaging unit 9.1, 9.2, 9.3, using the processing unit 11, determining 104 an object detecting capability representative of a capability of the processing unit 11 to detect objects 3.1, 3.2, 3.3 in the field 5.1, 5.2, 5.3, using the processing unit 11, and illuminating 106 the field 5.1, 5.2, 5.3 when the object detecting capability is lower than a predetermined threshold value, using the illumination unit 13.1, 13.2, 13.3.

Since the method 100 comprises the step of illuminating 106 the field 5.1, 5.2, 5.3 when the object detecting capability is lower than the first predetermined threshold value, a method 100 is provided having an improved capability to detect objects 3.1, 3.2, 3.3 in the field 5.1, 5.2, 5.3 surrounding the vehicle 7.

According to some embodiments, the method 100 further comprises:

determining 107 the object detecting capability by, processing 108 the images captured by the imaging unit 9.1, 9.2, 9.3, using the processing unit 11.

Thereby, an easy and reliable determining 107 of the object detecting capability is provided. Further, an instant determining 107 of the object detecting capability may be provided. Even further, a situation based determining 107 of the object detecting capability is provided.

According to some embodiments, the method 100 further comprises:

determining 109 a distance d to an object 3.2 in the field 5.1, and determining 110 the object detecting capability based on the distance d, using the processing unit 11.

Since the method comprises determining 110 the object detecting capability based on the distance d, objects 3.1, 3.2, 3.3 being a greater distance d from the vehicle 7 hosting the arrangement 1 will more likely be illuminated than objects 3.1, 3.2, 3.3 being closer to the vehicle 7 hosting the arrangement 1. As a result, the method 100 of detecting objects 3.1, 3.2, 3.3 is further improved.

According to some embodiments, the method 100 further comprises:

determining 111 the object detecting capability by, determining 112 an illumination condition in the field 5.1, 5.2, 5.3, using the processing unit 11.

Since the method comprises determining 111 the object detecting capability by determining 112 an illumination condition in the field 5.1, 5.2, 5.3, the field 5.1, 5.2, 5.3 is illuminated when an illumination condition in the field 5.1, 5.2, 5.3 is poor. As a result, the method 100 of detecting objects 3.1, 3.2, 3.3 is further improved.

According to some embodiments, where the arrangement 1 further comprises a positioning arrangement 15, the method 100 further comprises:

determining a geographic position of the vehicle 7, using the positioning arrangement 15, and determining the object detecting capability based on the geographic position of the vehicle 7.

Since the method 100 comprises determining the object detecting capability based on the geographic position of the vehicle 7, fields 5.1, 5.2, 5.3 surrounding a vehicle 7 will be illuminated when the geographic position of the vehicle 7 corresponds to a position where an object detecting capability is low.

According to some embodiments, where the illumination unit 13.1, 13.2 comprises ground lights, the method 100 further comprises:

illuminating a ground surface surrounding the vehicle 7 upon entry into, or upon exit from, the vehicle 7, to improve light conditions at the ground surface using the illumination unit 13.1, 13.2.

According to some embodiments, the method 100 further comprises:

illuminating the field 5.1, 5.2, 5.3 with a higher luminosity when the object detecting capability is lower than a second predetermined threshold value, than when the object detecting capability is between the first predetermined threshold value and the second predetermined threshold value, using the illumination unit 13.1, 13.2, 13.3, where the object detecting capability below the second predetermined threshold value is lower than an object detecting capability between the first predetermined threshold value and the second predetermined threshold value.

As a result, a method 100 of detecting objects 3.1, 3.2, 3.3 is provided with further improved object detecting capability and where distraction of surrounding vehicle drivers and pedestrians is avoided.

According to some embodiments, in which the arrangement 1 further comprises a positioning arrangement 23 comprising the object detecting arrangement 1, a processing unit 12, and a communication unit 24, the method 100 further comprises:

receiving 113 electronic map data representative of an environment surrounding the vehicle 7 from a database 25.1, 25.2 holding the electronic map data, using the communication unit 24, and determining 114 a position of the vehicle 7 by comparing 115 a position of an object 3.2 detected by the object detecting arrangement 1 with a position of the object 3.2 in the electronic map data, using the processing unit 12.

Thereby, a method 100 is provided having an improved capability to determine a position of the vehicle 7 since the method provided has an improved capability to detect objects 3.2 in the field 5.1 and since the method 100 comprises comparing 115 a position of an object 3.2 detected by the object detecting arrangement 1 with a position of the object 3.2 in the electronic map data.

As one skilled in the art would understand, any of the above-mentioned arrangements, units and other components, such as components 1, 9.1, 9.2, 9.3, 11, 12, 13.1, 13.2, 13.3, 15, 21, 23 and 24, may include suitable hardware and/or software, such as one or more processors (e.g., one or more microprocessors, microcontrollers and/or programmable digital signal processors) in communication with one or more storage devices or media including computer readable program instructions that are executable by the one or more processors so that the particular component may perform particular algorithms represented by the functions and/or operations described herein. Each arrangement, unit and other component (e.g., 1, 9.1, 9.2, 9.3, 11, 12, 13.1, 13.2, 13.3, 15, 21, 23 and 24) may also, or instead, include one or more application specific integrated circuits, programmable gate arrays or programmable array logic, programmable logic devices, or digital signal processors.

While exemplary embodiments are described above, it is not intended that these embodiments describe all possible forms according to the disclosure. The words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An object detecting arrangement configured to detect objects in a field surrounding a vehicle hosting the arrangement, the arrangement comprising:

an imaging unit configured to capture images of the field, wherein the imaging unit is arrangeable at the vehicle such that the field is in a direction of at least one of a side of the vehicle and a rear of the vehicle, wherein the direction of the side of the vehicle is essentially perpendicular to an intended direction of travel of the vehicle;

a positioning arrangement configured to determine a geographic position of the vehicle;

a processing unit configured to detect objects in the field by processing images captured by the imaging unit, wherein the processing unit is further configured to determine an object detecting capability representative of a capability of the processing unit to detect objects in the field based on the geographic position of the vehicle; and an illumination unit configured to illuminate the field when the object detecting capability is lower than a first predetermined threshold value.

2. The arrangement according to claim 1 wherein the processing unit is configured to determine the object detecting capability by processing the images captured by the imaging unit and by a comparison of the images captured with images stored in a database comprising identification of a lack of detection of an object with an expected detection of an object.

3. The arrangement according to claim 1 wherein the processing unit is configured to determine a distance to an object in the field, and wherein the object detecting capability is based on the distance such that the object detecting capability is lower in case of greater distance to the object than in case of a shorter distance to the object.

4. The arrangement according to claim 1 wherein the illumination unit comprises ground lights arrangeable to illuminate a ground surface surrounding the vehicle upon entry into, or upon exit from, the vehicle, to improve light conditions at the ground surface.

5. The arrangement according to claim 1 wherein the illumination unit is configured to illuminate the field with a higher luminosity when the object detecting capability is lower than a second predetermined threshold value, than when the object detecting capability is between the first predetermined threshold value and the second predetermined threshold value, wherein the object detecting capability below the second predetermined threshold value is lower than an object detecting capability between the first predetermined threshold value and the second predetermined threshold value.

6. A lane keeping arrangement comprising an object detecting arrangement according to claim 1.

7. A positioning arrangement comprising:

an object detecting arrangement according to claim 1; and a processing unit and a communication unit configured to receive electronic map data representative of an environment surrounding the vehicle from a database holding the electronic map data, wherein the processing unit is configured to determine a position of the vehicle by comparing a position of an object detected by the object detecting arrangement with a position of the object in the electronic map data.

8. A vehicle comprising an object detecting arrangement according to claim 1.

9. A method of detecting objects in a field surrounding a vehicle using an object detecting arrangement hosted in the vehicle, wherein the arrangement comprises an imaging unit configured to capture images of the field, a positioning arrangement configured to determine a geographic position of the vehicle, a processing unit, and an illumination unit, wherein the imaging unit is arranged at the vehicle such that the field is in a direction of at least one of a side of the vehicle and a rear of the vehicle, and wherein the direction of the side of the vehicle is essentially perpendicular to an intended direction of travel of the vehicle, the method comprising:

capturing images of the field using the imaging unit;

detecting, using the processing unit, objects in the field by processing images captured by the imaging unit;

determining, using the processing unit, an object detecting capability representative of a capability of the processing unit to detect objects in the field based on the geographic position of the vehicle; and illuminating, using the illumination unit, the field when the object detecting capability is lower than a predetermined threshold value.

10. The method according to claim 9 wherein determining the object detecting capability comprises processing the images captured by the imaging unit using the processing unit and by a comparison of the images captured with images stored in a database comprising identification of a lack of detection of an object with an expected detection of an object.

11. The method according to claim 10 further comprising determining a distance to an object in the field, wherein determining the object detecting capability comprises determining the object detecting capability based on the distance such that the object detecting capability is lower in case of a greater distance to the object than in case of a shorter distance to the object.

12. The method according to claim 9 further comprising:

receiving electronic map data representative of an environment surrounding the vehicle from a database holding the electronic map data, using a communication unit of a positioning arrangement that includes the object detecting arrangement; and determining a position of the vehicle by comparing a position of an object detected by the object detecting arrangement with a position of the object in the electronic map data, using a processing unit of the positioning arrangement.

* * * * *